(No Model.)

F. N. STEVENS.
UNIVERSAL CONNECTION.

No. 590,532.  Patented Sept. 21, 1897.

WITNESSES:
Chas. W. Marvin.
Mary A. Franklin.

INVENTOR
Frank N. Stevens,
BY
Smith & Alinson
ATTORNEYS.

UNITED STATES PATENT OFFICE.

FRANK NELSON STEVENS, OF SENECA FALLS, NEW YORK.

UNIVERSAL CONNECTION.

SPECIFICATION forming part of Letters Patent No. 590,532, dated September 21, 1897.

Application filed October 26, 1896. Serial No. 610,039. (No model.)

*To all whom it may concern:*

Be it known that I, FRANK NELSON STEVENS, of Seneca Falls, in the county of Seneca, in the State of New York, have invented new and useful Improvements in Universal Connections, of which the following, taken in connection with the accompanying drawings, is a full, clear, and exact description.

My invention relates to devices for connecting an air-pipe to a valve-nipple, as the valve of a pneumatic tire for a vehicle.

My object is to produce a simple and durable connection easy to operate to couple or uncouple an air-pipe to or from a valve-nipple, suitable means being employed to prevent leakage and without the intervention of an extra nipple-piece or reducer.

My connection, broadly stated, comprises a body and a nut rotatable in or upon it and either exteriorly or interiorly threaded to enter or receive a valve-nipple, suitable means being employed to prevent any accidental separation of the members and also to prevent leakage.

It is constructed as follows, reference being had to the accompanying drawings, in which—

Figure 1:
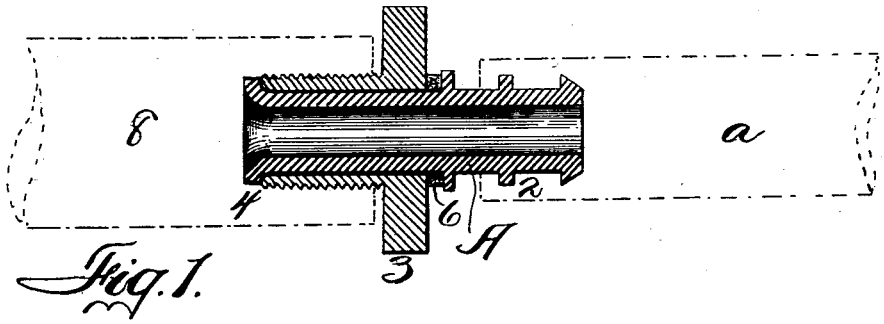
Figure 2:
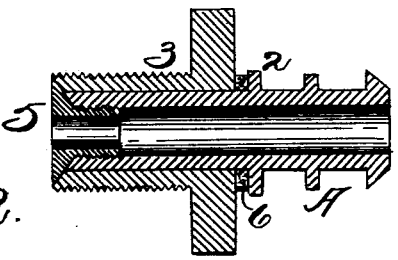

Figure 1 is a longitudinal section of the connection, the dotted lines indicating the air-tube and the nipple-body. Fig. 2 is a like view of the construction shown in Fig. 1, except that the body and nut are secured together by a tubular screw.

A is a tubular body provided on one end with suitable projecting flanges 2, corrugations, or the like to aid in securing the air-tube *a* thereunto, said tube being suitably connected to an air-pump or reservoir for compressed air. A tubular nut 3 is mounted upon said body and is secured loosely thereon, so as to be readily rotated around said body, by expanding the end of the body, as at 4, and in Fig. 2 by the tubular screw 5. A suitable washer 6 is secured between the nut and the inner flange to prevent leakage. The nut is exteriorly threaded to properly enter an interiorly-threaded valve-nipple 8. It will be seen that the tubular body passes entirely through the nut and that the means for preventing the separation of the two parts consists in a flange or collar 2 upon one side of the nut, and upon the other the end of the pipe is flared outwardly, or a tubular screw 5 is inserted in its end. The construction here shown is specially adapted for use in bicycle-pumps, where it is especially desirable to have the nut rotated independently of the air-pipe. In any of the connections shown the rotation of the nut independent of the air-pipe screws the connection into or onto a nipple or unscrews it.

Having described my invention, what I claim, and desire to secure by Letters Patent, is—

A tubular body, combined with a flanged screw-threaded nut that is placed thereon, the body being provided with means upon both sides of the nut for swiveling it in position, and which body is made to extend through the nut, substantially as shown and described.

In witness whereof I have hereunto set my hand this 22d day of October, 1896.

FRANK NELSON STEVENS.

In presence of—
   MARY A. FRANKLIN,
   HOWARD P. DENISON.